March 25, 1947. E. W. BARNHART 2,417,963
STEERING MECHANISM FOR PORTABLE HOISTS AND EXCAVATORS
Filed Sept. 28, 1943 2 Sheets-Sheet 1
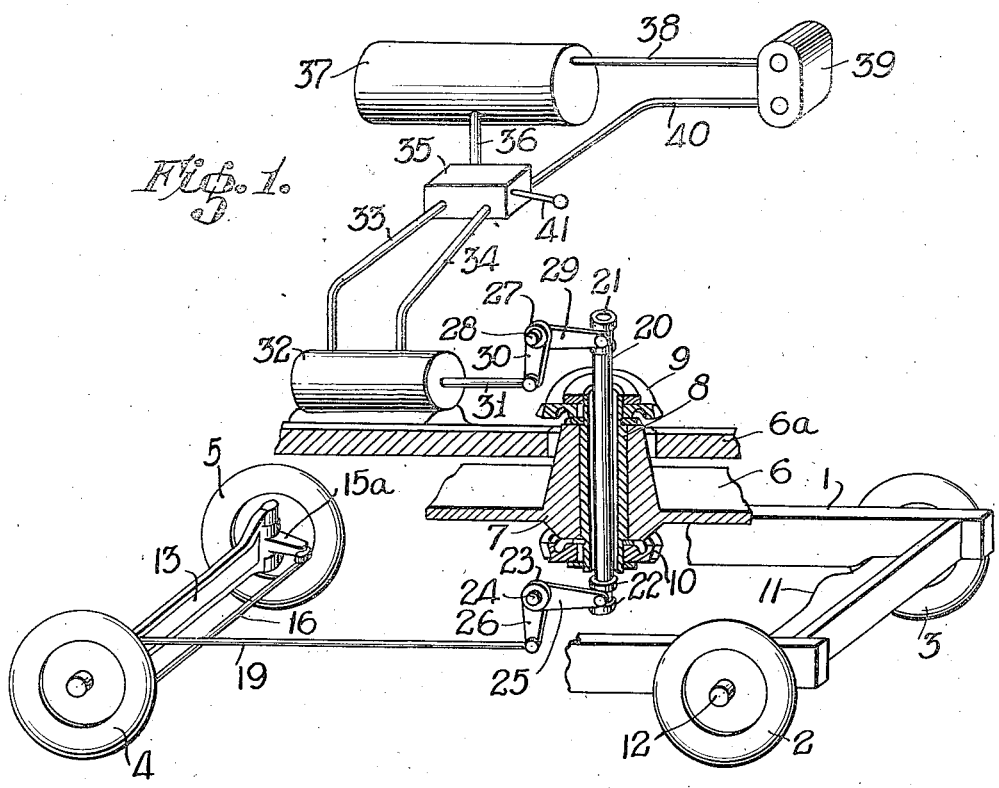
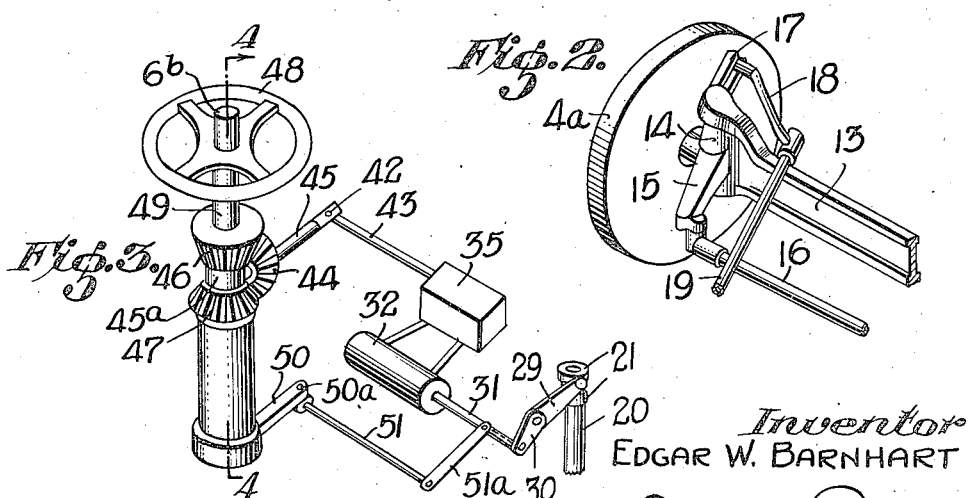
Inventor
EDGAR W. BARNHART
by Alfred F. Dees
Attorney March 25, 1947.  E. W. BARNHART  2,417,963
STEERING MECHANISM FOR PORTABLE HOISTS AND EXCAVATORS
Filed Sept. 28, 1943  2 Sheets-Sheet 2
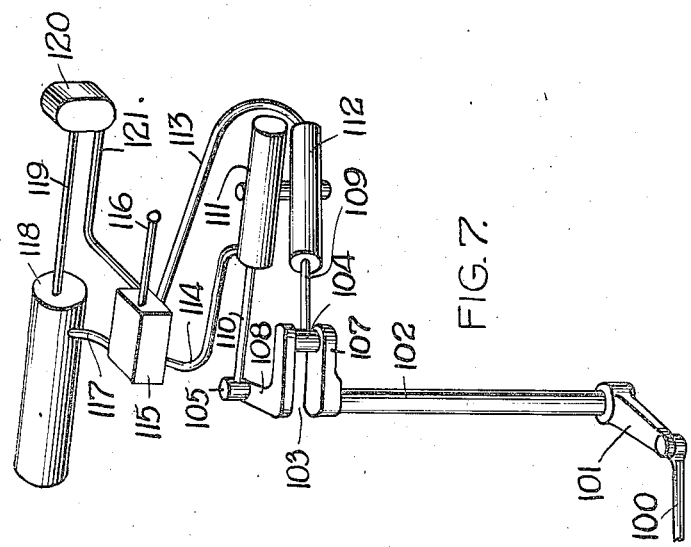
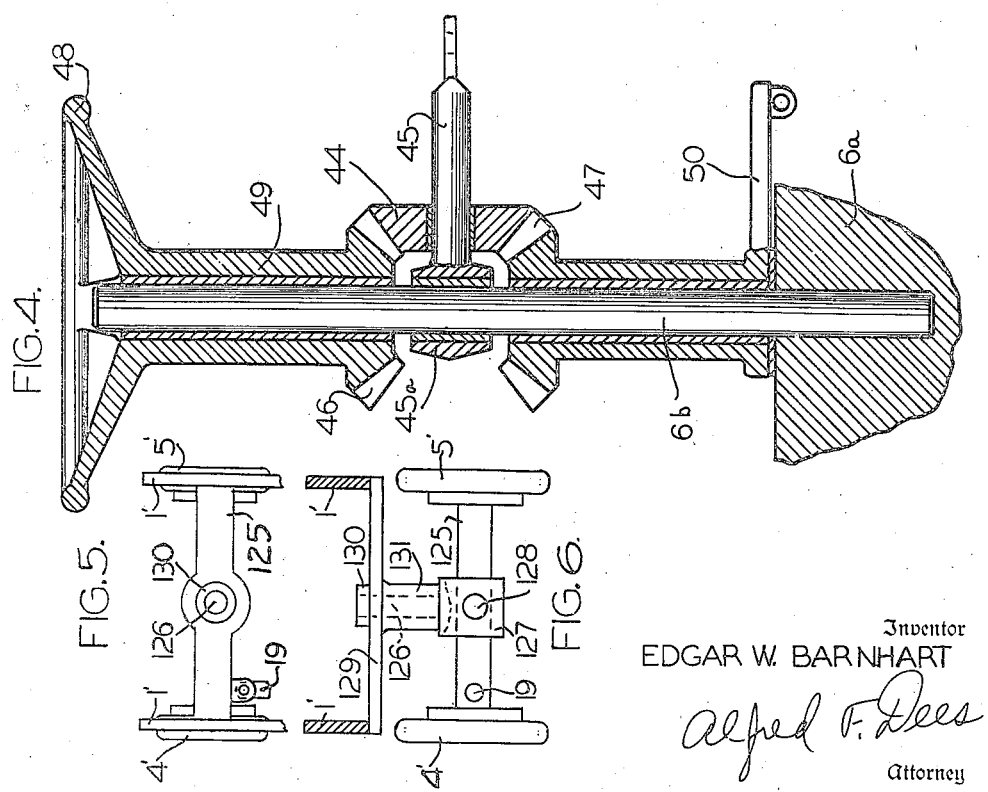
Inventor
EDGAR W. BARNHART
Alfred F. Dees
Attorney Patented Mar. 25, 1947

2,417,963

UNITED STATES PATENT OFFICE 2,417,963

STEERING MECHANISM FOR PORTABLE HOISTS AND EXCAVATORS

Edgar W. Barnhart, Marion, Ohio, assignor to The General Excavator Company, Marion, Ohio, a corporation of Ohio Application September 28, 1943, Serial No. 504,198

18 Claims. (Cl. 180—79.2)

1

This invention relates to motor operated steering mechanisms and in its more specific aspects is particularly directed to a pressure fluid and a mechanical force-transmitting system for steering a wheeled, rubber tired chassis mounting a hoist or excavator and that is operable in any relative rotative position of the deck of such hoist or excavator with respect to the chassis thereof.

The object of this invention is to provide a power or motor actuated steering mechanism operable in any relative rotative position of the deck or upper body and chassis.

Another object of the invention is to provide a hydraulic steering mechanism directly linked to the shiftable wheels of a chassis to steer the hoist in any rotative position of the rotatable deck on which the operative mechanism is mounted.

Another object of the invention is the provision of a steering mechanism operated from the prime mover mounted on the deck of the hoist having a linkage operable through the shaft about which said deck rotates and controllable in any rotative position of said deck.

A further object of the invention is the provision of a steering mechanism for a wheel mounted or pneumatically tired hoist or excavator chassis whose source of power is derived from the prime mover and so arranged that the steering is controlled through the deck journal and operable in any rotative position of the deck.

A still further object of the invention is the provision of a linkage in the steering mechanism having a portion concentric with the journal supporting the deck for rotation relative to the chassis and adapted to allow the rotation of said deck relative to said linkage.

Another and still further object of the invention is to provide a pressure fluid steering mechanism for a pneumatically or solid tired hoist or excavator chassis in which a portion of said mechanism is concentrically disposed in the deck journal and shaft mechanism that is mechanically linked to the pair of wheels of said chassis employed in steering and controllable in any rotative position of said deck.

Another and still further object of the invention is to provide a power operated steering mechanism for a wheel supported chassis controllable from the operator's station and operable in any position of the operator's station relative to the chassis supporting same.

Another and further object of the invention is to provide a power or motor operated steering mechanism having a portion pressure fluid actuated and a portion mechanical and in which a

2 part of the mechanical portion is disposed in the journal connecting the deck and chassis supported frame, the control for said mechanism located at the operator's station.

Another object of the invention is the provision of a steering mechanism in which the deck journal and steering shaft or rod are movable relative to each other thereby enabling the control to be operative in any rotative position of the deck.

Another and still further object of the invention is the transmission of power in a shaft concentrically arranged with respect to the deck's journal either relatively rotatively or axially thereof for steering the hoist or excavator.

Another and still further object of the invention is to provide mechanism for transmitting force relatively rotatively or axially of the deck journal to shift the pivoted wheels of the chassis.

Other and still further objects of the invention will appear to those skilled in the arts to which this invention pertains as the description proceeds which taken in connection with the accompanying drawings sets forth a preferred embodiment of the invention and selected modifications thereof but such disclosures are not to be construed as a limitation of the invention which is limited only by the appended claims and any and all modifications, alterations and variations of structure coming within the spirit and scope thereof are deemed to be included herein.

In the drawings:

Fig. 1 shows an elevational schematic view of the preferred embodiment of my invention.

Fig. 2 shows a detail view of a portion of the steering mechanism associated with the pivoted wheels.

Fig. 3 shows a variation of the control for the pressure fluid system of Fig. 1.

Fig. 4 is a section view taken substantially along the line 4—4 of Fig. 3.

Fig. 5 is a plan view of a portion of the chassis showing a modification of the wheel and axle mounting.

Fig. 6 shows an elevational view of the structure of Fig. 5.

Fig. 7 shows a modified form of power transmitting mechanical linkages for transmitting rotating motion relative to the deck journal shaft.

The steering of the earlier types of hoists, excavators, drag-lines, etc. employing the caterpillar or track laying type of traction units has in the past been accomplished by the engagement or disengagement of the drive clutches controlling each of the traction units such that one or the other of the traction unit's motion could be arrested and keeping the clutch to the other unit engaged causing its corresponding track laying unit to keep in motion; the entire unit then pivoting about the traction unit held at rest and when the excavator or hoist is pointing in the right direction having both traction unit drive clutches engaged. This expedient has also been employed on certain types of wheeled traction devices but the primary requisite of that type of steering is that the shovel, excavator, hoist or traction device move at only comparatively slow speeds. The shafts, transmissions, etc. usually rotate at fairly low speeds and the mechanical linkage extending from the control station to the clutch and its operating linkage extending through the deck journal though cumbersome and difficult to operate was still satisfactory in view of the low rate of travel of the device. Various forms of hydraulic devices have been developed in the prior art to control the clutches that have pressure fluid transmitting conduit suitably arranged through the deck journal for controlling the clutch actuating motors but these devices like those previously discussed are primarily adapted to low speed devices customarily associated with shovels, hoists, etc. of the prior art.

The advent of solid or pneumatically tired chassis for shovels, hoists, excavators, etc. has introduced the element of high traverse speed of the chassis over the ground and because of the fact that the device must be steered from the operator's station on the rotatable deck the usual type of motor truck and tractor steering devices are not employable, the latter expedient not permitting any swinging motion of the steering control. The higher speed chassis has necessitated the adoption of a transmission unit comparable to that of a motor truck and the elimination of the dual clutch of the track laying traction unit or caterpillar tread. It is necessary that the operator steer the excavator or hoist, etc. from his station and with the pivoted front wheels characteristic of the motor truck and requiring great force to pivot the wheels some form of power unit is necessary that will be flexible and capable of transmitting power through the deck journal and thence applying it to the forward wheels for steering the chassis. Furthermore, the weight of these machines is such that hand steering is difficult and in some cases very nearly impossible. The operator in view of being required to attend to a number of other controls cannot give undivided attention to steering so must have something that will respond quickly and positively. This has been provided in the device disclosed in the accompanying drawings which is not only simple to operate but is definite and certain in its action, economical to manufacture, functioning in any rotatable position of the deck relative to the chassis, easy to maintain and which transmits power from the upper side of the deck to the front wheel twisting mechanism below the deck associated with the chassis with no interference with the rotative movement of the deck on its journal.

The preferred embodiment of the invention is disclosed in Fig. 1 which shows a portion of a chassis 1 supported on wheels 2, 3, 4 and 5 which may be of the pneumatically or solid tired type. For reason of clarity of disclosure only a portion of the chassis is shown. The chassis has built thereon an upper body (not shown) or deck supporting frame 6 well known to the art on which the said upper body or deck element 6a is mounted for rotation, the deck being shown only schematically. The term "deck" as employed herein is intended to have a meaning coextensive with the terms "upper body" and is to be construed herein as such. The deck 6a is adapted to be rotated by mechanism well known to the arts. The supporting frame 6 has an enlarged boss or gudgeon 7 thereon which supports a hollow shaft 8 having gears 9 and 10 fixed to the ends thereof for ultimately transmitting power to the driving element 11 on rear axle 12. The organization of this shaft, gearing, deck or upper body unit, etc. may be similar to that shown in Figs. 1 and 3 as disclosed in companion copending application S. N. 490,091, filed June 8, 1943, which has since become abandoned. Wheels 2 and 3 are supported on shaft 12 and are usually doubled or tripled depending upon the size of tire and unit on which they are employed. Wheels 4 and 5 are shown as pivotally supported on front axle 13. An alternative form of front wheel support is subsequently discussed herein.

Fig. 2 shows the wheel and rim 4a and its axle fixed to a knuckle pin assembly 14 having an arm 15 secured thereto. Rod 16 is pivotally connected to arm 15 and its opposite end is pivotally connected to simple knuckle pin arm 15a on the other front wheel 5. The knuckle pin assembly 14 is provided with a bracket arm 17 having a lever 18 associated therewith that at its opposite ends is secured to bar 19. The construction thus far is very similar to that employed on wheeled vehicles such as motor trucks, tractors and the like. Other forms of linkage connection may be employed between chassis and front wheels than those set forth such e. g. as in Figs. 5 and 6 and the selection of any one type is not to be regarded a limitation of the invention.

Figs. 5 and 6 show a different type of axle mounting for front wheels 4' and 5'. These wheels are shown rotatably mounted on a rigid axle 125 to which rod 19 is secured. Centrally of the axle 125 a special form of king pin 126 is pivotally associated with the axle 125. The king pin 126 has an enlargement at its one end formed into an eye 127 with a pin 128 therein which extends through the axle 125. The axle 125 is therefore pivotally mounted on the king pin 126. The pin 126 extends upward through a bolster 129 that has a spacer element 131 thereon and adapted to have a bearing engagement with a cooperating portion of the eye head 127 of pin 126. At its upper end pin 126 is provided with a suitable retaining element 130. Bolster 129 and spacer 131 rotate relatively of the pin 126 thereby enabling a power source, subsequently described, connected to the rod 19 to twist wheels 4', 5' and axle 125 relatively of the bolster for steering purposes. Chassis 1', 1' is secured directly to the bolster 129 and the pivoted axle 125 enables it to partially compensate for undulations in terrain.

The schematic representation of deck or upper body supporting element 6 is shown mounted on the chassis-frame 1 and may be secured thereto by any well known conventional means. Gudgeon 7 provides the journaling means for deck 6a and within the gudgeon 7 a hollow inner shaft 8 is concentrically disposed of the gudgeon 7 and deck journal. Within shaft 8 a rod or plunger 20 is arranged provided with collars or rings 21, 21 on its one end and collars or rings 22, 22 on its other end. A bell crank 23 has a shaft 24 which is pivotally supported in appropriate bearings (not shown) on the chassis 1 and has a pair of arms 25 and 26 angularly disposed thereon with the rod or bar 19 directly connected with arm 26 thereby completing the linkage between the front wheels and the concentric rod 20. Arm 25 may be forked at its free end, if so desired, and is appropriately pinned or rollered in a conventional manner, the latter fitting in between the collars or rings 22, 22.

A second bell crank 27 is provided with a shaft 28 that is adapted to be journaled in an appropriate bearing associated with the deck 6a. The bell crank has two angularly disposed arms 29 and 30 fixed thereto, the former similar in construction to arm 25 such that there may be relative rotation between plunger or rod 20 and arms 29 and 30. Any type of slip connection between these parts may be satisfactorily employed or such expedients as described in connection with arm 25.

The arm 30 is pivotally connected to piston rod 31 of pressure fluid motor 32. Motor 32 is rigidly mounted on deck 6a and rotates in unison therewith. Conduits 33 and 34 are connected to opposite ends of the cylinder 32 and their other ends are connected to one side of reversing valve 35, conventional in character, for selectively directing pressure fluid to opposite ends of the motor 32. The valve is supplied by conduit 36 connecting with pressure fluid storage tank 37 supplied through conduit 38 from pump 39, driven from the vehicle engine or other suitable prime mover, that draws exhaust pressure fluid from the motor 32 through valve 35 and conduit 40. This hydraulic system, as will be noted, is a closed system chosen because it can be compactly arranged and assembled in the cab of the hoist or excavator. Lever 41 is provided to shift valve 35 and it is preferably arranged adjacent the operator's station or within easy reach and accessibility from his station.

It will be evident that when piston rod 31 is moved by pressure fluid selectively admitted to either end of motor 32 that bell crank 27 will be rotated about shaft or rod 28 and that arm 29 will raise or depress rod 20. This movement will cause bell crank 23 to rotate about shaft 24 and will further cause rod 19 to be moved axially of itself thereby twisting wheels 4 and 5 on their knuckle pins to steer the device 6a or wheels 4', 5' and axle 125 on pin 126 relative to bolster 129 and chassis frame 1', 1' in Figs. 5 and 6. Since the pressure fluid end of the system is mounted above and on the deck 6a it is clear that rotation will and can be relative to the rod 20 by virtue of the rings or collars 21, 21 and 22, 22, and will therefore be effective in any relative rotated position of the deck to the chassis.

Figs. 5 and 6 show a farm wagon type of support on which the axle 125 on which wheels 4', 5' are rotatably supported. The rod 19 is associated with the axle 125 to twist the wheels 4', 5' for steering purposes. Axle 125 is pivoted to a member 127 by means of pin 128 to enable it to pivot about a horizontal axis. A spacer 131 is arranged between bolster 129 and member 127 and member 130 holds pin 126 in position. The steering action takes place as described in the immediately preceding paragraph.

A variation of the control for valve 35 is set forth in Figs. 3 and 4 in which a wheeled control is provided to make the action similar to that on a truck, tractor or other wheeled vehicle and in which Fig. 4 is a vertical section view of the mechanism shown in Fig. 3.

The steering action under the modification of Figs. 3 and 4 is controlled through the valve 35 previously described and has a valve actuating rod 43 extending therefrom pivotally linked to a spindle 45 by means of a pin connection as at 42. Spindle 45 has a bearing 45a and is pivoted or journaled on a stationary vertical bar or rod 6b rigidly fixed to deck 6a.

The piston rod 31 of motor 32 is rigidly connected to a bar 51 by means of a bar 51a schematically representing this rigid connection. Bar 51 is pivoted at 50a to the outer end of an arm 50 integrally associated with the downward extended hub of a gear 47. This gear meshes with a gear 44 journaled on spindle 45. The latter gear 45, meshes with a gear 46 whose hub 49 is extended upwardly and is then formed into a wheel 48. Wheel 48, hub 49, gear 47 and arm 50 are rotatable relatively of each other about the axis of support 6b which is centrally disposed of the several gear members 46 and 47.

The operation of the above device depends upon the relative movement of the three gears 44, 46 and 47. If wheel 48 is rotated it is apparent that, because gear 47 is held against rotation by reason of its rigid connection to rod 51 gear 44 will roll on gear 47. This action will cause spindle 45 to rotate about 6b as an axis, because of the rolling action of gear 44 on stationary gear 47, thereby opening valve 35. Wheel 48 is then held manually by the operator and because pressure fluid is admitted to motor 32, it will twist the wheels 4 and 5 as recited above. The movement of rod 31 will simultaneously cause gear 47 to rotate about 6b as an axis and cause gear 44 to roll relative to gear 46 now the stationary gear, thereby rotating spindle 45 about 6b as an axis but oppositely to the rotation above described thereby gradually closing valve 35 and ultimately stopping motor 32. As long as wheel 48 is held stationary the wheels 4 and 5 will remain twisted and upon rotating wheel 48 in a direction reversely to that defined above, then valve 35 and motor 32 will move oppositely to the movement previously described thereby re-aligning wheels 4 and 5 with wheels 2 and 3 for straight ahead motion. This action as previously stated simulates the customary drive for a tractor or truck wherein the steering wheel is held in a twisted position until the desired degree of turn has been accomplished whereupon the wheel is reversely rotated to right or re-align the wheels of the vehicle.

The disclosure of Fig. 7 shows a further modified control in which rod 100 is pivotally secured to a lever 101 rigidly secured to vertical shaft or rod 102. Rod 100 serves the same purpose as do rods 19 and 74 and rod or shaft 102 is adapted to be disposed within a shaft corresponding to hollow shaft 8 and is intended to be held therein for relative rotative movement with respect to the said hollow shaft.

Fixed to the upper end of shaft or rod 102 is a double crank mechanism 103 having crank pins 104 and 105 fixed onto the crank arms 107 and 108 respectively. The representation of Fig. 7 shows a secondary arm for purposes of clarity but a simple bell crank as arm 108 could be used with equal propriety and directly affixed to the shaft 102.

Pivotally secured to the crank pins 104 and 105 are piston rods 109 and 110 respectively of single acting pressure fluid motors 111 and 112 which are intended to be appropriately supported on the deck of a hoist or excavator.

The motors 111 and 112 are connected to a pump, valve and pressure storage system similar in plan to that of Fig. 1, but in this disclosure the conduit 113 is connected e. g. to the closed end of motor 112 and conduit 114 is connected to the rod 110 end of motor 111. Each of the conduits are connected to a conventional reversing valve 115 having a control or shifting element 116.

Conduit 117 connects one side of valve 115 to pressure storage tank 118 that is connected to the pump 120 by conduit 119. Conduit 121 connects the other side of valve 115 with pump 120. Pump 120 is adapted to be driven from a prime mover mounted on the deck of the hoist or excavator. Conduit 121 is intended to be the pump intake and conduit 119 the exhaust leading to the pressure storage tank 118. Pressure fluid is received from the pressure storage tank 118 and is admitted to reversing valve 115 and is then selectively applied to either of motors 112 or 111 and conduit 121 takes fluid from one or the other of said motors and pressure fluid is exhausted therefrom by the pump 120; thereby enabling whichever motor that has pressure fluid applied to it to twist shaft or rod 102 thereby axially moving rod 109 to twist the front wheels connected thereto to steer the hoist or excavator. A reversal of valve 115 will reverse the aforementioned movement to restore said chassis wheels to neutral or whichever direction they are to be set. This device is likewise operable and controllable from any rotatable position of the deck relative to the chassis and enables the operator to conveniently control his machine at all times.

That which is regarded new, novel and useful and which is sought to be protected by Letters Patent of the United States is as follows:

1. In a steering mechanism for a portable hoist; a wheeled chassis in which two of the wheels are supported on a pivoted assembly secured to one end of a chassis and so arranged as to pivot in unison; a deck element; journal means to support said deck for rotation on said chassis; a shaft rotatably supported in said journal means; a rod axially movable in said means; means connecting said rod and said assembly; a reciprocating pressure fluid motor mounted on said deck operatively connected to said rod to axially move same to thereby pivot said assembly; and control means on said deck for said motor to govern its motion.

2. In a steering mechanism for a portable hoist; a wheeled chassis having a pivoted wheel assembly on one end thereof for steering the chassis; a deck rotatably supported on said chassis; means supporting said deck for rotation; a hydraulic motor to twist said wheel assembly mounted on said deck; control means to govern the motion of said motor mounted on said deck; rod means extending axially of said means for transmitting force originating on the deck to said assembly; means connecting said motor and said rod to move said rod axially to thereby actuate said pivoted wheel assembly; and means connected between said motor and said rod to enable said wheel assembly to be actuated by said motor in any rotated position of said deck.

3. In a steering mechanism for a wheeled chassis of a portable hoist or excavator; a chassis element having a pivoted forward wheel assembly with which to steer said hoist; a pressure fluid motor to shift said assembly; a deck element rotatable relative to said chassis; a journal rotatably supporting said deck on said chassis; said motor mounted on said deck; a shaft concentrically disposed in said journal; a source of pressure fluid for said motor operable from a prime mover; rod means to transmit force ultimately applied to said wheel assembly concentrically disposed in said shaft; means connecting said rod means and said motor to enable said motor to move said rod means axially of said shaft; and means to control said force disposed above said deck, said means controllable in any rotative position of said deck.

4. In a steering mechanism for a self propelled hoist or excavator; a wheeled chassis having a pivoted forward wheel assembly; a deck rotatably mounted with respect to said chassis; means journaling said deck on said chassis; a shaft concentrically disposed of said journaling means; a pressure fluid motor disposed above and on said deck; a rod concentrically disposed of said shaft; means connecting said motor and said rod to cause said rod to move axially of said shaft; said motor actuating said rod in any rotative position of said deck; a second rod connectable to said pivoted wheel assembly; means connecting said rod in said shaft and said second rod such that motion imparted to said rod by said motor is transmitted through said second rod to said wheel assembly to twist it relative to said chassis to effect a steering of said chassis.

5. In a steering mechanism for a portable hoist; a wheeled chassis in which the forward wheels are arranged on a device adapted to twist them as a unit to steer said chassis; a deck mounted on said chassis; journal means rotatably supporting said deck on said chassis; a hollow shaft disposed within said journal; a pressure fluid motor on said deck; a valve to control said motor; a force transmitting means extending axially of said shaft; means connecting said motor and said force transmitting means to move it axially of said shaft; a rod operatively associated with said device; and means connecting said rod and said force transmitting means such that force from said motor applied to said force transmitting means and rod will be transmitted to said device to twist the wheels thereon relative to said chassis; said connecting means allowing said deck and shaft to rotate relative to said force transmitting means.

6. In a steering device for a portable hoist; a wheeled chassis, the forward wheels thereof supported on a device swingably mounted on said chassis to steer same; a deck element; journal means rotatably supporting said deck on said chassis; a hollow shaft concentrically disposed in said journal means; a pressure fluid reciprocating motor disposed above and associated with said deck; a force transmitting means axially disposed in said shaft; means connecting said motor and said force transmitting means to impose axial movement on said force transmitting means; a rod associated with said swingable wheel supporting device; means connecting said rod and said force transmitting means; and each of said connecting means so constructed and arranged that said force transmitting means may rotate relatively of said deck.

7. In a steering mechanism for a portable hoist; a wheeled chassis, the forward wheels of which are supported on a device pivoted to said chassis to steer same; a deck; means journaling said deck with respect to said chassis; a hollow shaft element within said journaling means; a pressure fluid system including a reciprocating motor disposed above said deck and adapted to be supported thereon; a control means for said pressure fluid system; a rod disposed within said shaft; means connecting said rod and motor to move said rod axially of said shaft; a second rod, associated with said pivoted device; means connecting said rod and said second rod such that axial motion will be imparted to said second rod from the axial motion of said rod; and each of said connecting means being so constructed and arranged that said rod and said deck may rotate relatively of each other.

8. In a wheeled carriage steering mechanism; a chassis element; a device mounting wheels pivoted to the forward end thereof and relatively fixed wheels associated with the rear end thereof; a deck element; means journaling said deck with respect to said chassis; power transmitting means arranged concentrically of said journaling means and movable axially thereof; said means actuable by power derived from a source of power on said deck; driven means below said deck adapted to receive power from said power transmitting means; means connecting said pivoted device and said driven means; and means to control said transmitting means in any rotative position of said deck with respect to said chassis.

9. In a wheeled chassis for a portable hoist; a chassis having a pivoted wheel supporting device thereon at one end and relatively fixed wheels on the other end; a deck; means journaling said deck for rotation relative to said chassis; a force transmitting element within said journaling means movable axially of said journaling means; a pressure fluid reciprocating motor system securable to said deck; means connecting said motor system and said force transmitting element to axially move same; a rod means associated with said pivoted wheel supporting device; means connecting said force transmitting element and said rod to transmit motion in any rotatable position of said deck relative to said force transmitting element; and means to control said pressure fluid system to twist said wheel supporting device relative to said chassis to steer same irrespective of the rotated position of said deck.

10. In a power steering system for a portable hoist; a chassis having a pivoted forward wheel supporting device and relatively fixed rear wheels; a deck element; means journaling said deck for rotation with respect to said chassis; a hollow shaft arranged within said journaling means; a first rod axially disposed and axially movable in said hollow shaft; a pressure fluid system terminating in a reciprocating motor element; means connecting said motor and said first rod to axially move same; a second rod associated with said pivoted wheel supporting device; means connecting said first rod and said second rod whereby motion originating in said motor is adapted to twist said wheel supporting device to steer said chassis; said means connecting said motor and said first rod allowing said deck to rotate relative to said shaft; and a reversing valve means to control the actuation of said motor to steer said chassis in any rotational position of said deck.

11. In a steering device for a portable hoist; a wheeled chassis having its forward wheels mounted on a device pivoted with respect to said chassis; a deck element; means journaling said deck for rotation with respect to said chassis; a hollow shaft concentrically disposed in said means; a reversible motor on said deck; an axially movable rod in said hollow shaft; means connecting said motor and said rod and to reversibly axially actuate said rod; a power translating means disposed below said deck operatively associated with said rod; and means connecting said device and said translating means such that the power transmitted by said rod will be applied through said translating means and said last mentioned means to twist said device and the wheels mounted thereon to steer said hoist to steer said chassis in any rotational position of said deck.

12. In a power operated steering mechanism for a portable hoist; a wheeled chassis having a forward wheel supporting device pivotally supported thereon; a deck; means journaling said deck on said chassis; a hollow shaft within said journaling means; a reversibly axially movable bar in said hollow shaft; pressure fluid motor means to reversibly move said bar; a rod connected to said device; and means connected between said rod and said bar whereby the reversible movement of said bar is applied to said rod to thereby pivot said device with respect to said chassis in order to steer said portable hoist; said means to reversibly move said bar mounted on said deck.

13. In a power steering mechanism for a hoist; a chassis having a pivoted forward wheel assembly thereon; a deck including a journal means supporting same for rotation on said chassis; a hollow shaft within said journal means; a rod concentrically disposed within said hollow shaft; means to axially actuate said rod receiving power from a source disposed above and on said deck including a pressure fluid motor; a bell crank connecting said motor and said rod within said shaft; rod means pivoted to said wheel assembly; bell crank means connecting said rod within said shaft and said rod means; means to control the action of said motor actuated means; and said rod within said shaft being so constructed and arranged that said deck and said shaft may rotate relative thereto to thereby steer said hoist in any rotative position of said deck.

14. In a steering mechanism for a portable hoist or excavator; a wheeled chassis having a pivoted forward wheel assembly; a deck; means journaling said deck on said chassis; a power transmitting means axially movable relatively to said journaling means; a rod connected to said pivoted wheel assembly; motion translating means connecting said rod and said power transmitting means; a reciprocating pressure fluid motor and a piston rod in said pressure fluid motor; means operatively connecting said motor to said power transmitting means to reversely axially operate same to twist said forward wheels to thereby steer said chassis in any rotational position of said deck relative to said chassis; a valve to control the admission of pressure fluid to said motor; means to control the valve which includes, a column held on said deck, a first and a second gear rotatably mounted on said column, said first gear having a control wheel fixed thereon, means connecting said second gear and said piston rod, a bar pivoted on said column and connected to said valve, and a third gear rotatably mounted on said bar meshing with said first and second gears; and said control wheel when rotated rotating said third gear, rolling said third gear relative to said second gear and simultaneously pivoting said bar on said column to open said valve, and when said first gear and wheel are held stationary said second gear is rotated by said motor, rotating said third gear, rolling same relative to said first gear and reversely pivoting said bar on said column to thereby close said valve.

15. In a steering device for a portable hoist or excavator; a wheeled chassis for a hoist or excavator, the forward wheels of which are mounted on a pivoted assembly mechanism; a deck; means journaling said deck on said chassis; a power transmitting means axially movable in and axially disposed in said journaling means; a rod pivoted to said forward wheel assembly mechanism; a motion translating means connecting said rod and said power transmitting means; a pressure fluid motor and a piston rod in said pressure fluid motor; means operatively connecting said power transmitting means with said motor; a reversing valve to control the admission of pressure fluid to said motor to reversely axially actuate said power transmitting means and to steer said chassis in any rotational position of said deck relative to said chassis; means to control the valve which includes a column fixed in said deck, a first gear having a wheel thereon rotatably mounted on said column, a bar pivoted on said column connected to said valve, a second gear rotatably mounted on said column having means thereon connected to said piston rod, and a third gear rotatably mounted on said bar meshing with said first and second gears; and said control wheel opening said valve when rotated relative to said column by rotating said first gear and said motor closing said valve by rotating said second gear, said third gear rolling on said second gear when said wheel is rotated and rolling on said first gear when said motor rotates said second gear; said third gear when rotated pivoting said bar on said column to shift said valve, the rolling action of said third gear on one or the other of said first or second gears pivoting said bar on said column.

16. In a steering mechanism for a portable hoist or excavator; a wheeled chassis; a deck on said chassis; journaling means to support said deck on said chassis; a rod axially disposed in said journaling means, said rod axially movable therein; means extending from said rod to pivoted wheels on said chassis to steer same including means to operatively connect same; means on said deck to reversibly axially actuate said rod to thereby twist said pivoted wheels and steer said chassis, said means including a reversible pressure fluid motor, means to reversibly actuate said motor and means to operatively connect said motor and said rod; and said motor controlled and actuatable in any rotational position of said deck relative to said chassis to steer same.

17. In a steering control, a deck and a wheeled chassis whose forward wheels are pivoted; means to journal said deck on said chassis; a rod extending axially of said journal; means extending between said rod and the pivoted wheels of said chassis; a motion translating means; power means connected to said translating means to reversibly axially move said rod in any rotational position of said deck relative to said chassis; and said last mentioned means including a motor and means to reversely operate said motor to thereby reversely axially actuate said rod and steer said chassis.

18. In a steering control mechanism; a wheeled chassis and a deck; means journaling said deck on said chassis; an axially movable rod centrally disposed in said journal means; means connecting said rod and the pivoted wheels on said chassis including means to connect said rod and said means; a reciprocating pressure fluid motor on said deck operatively connected to said rod to axially move same; valve means to control the operation of said motor, said motor operable in any rotational position of said deck relative to said chassis; and means arranged between said valve and said motor automatically operated to close said valve when said pivoted wheels have achieved the desired degree of twist.

EDGAR W. BARNHART.

REFERENCES CITED

The following references are of record in the file of this patent:

UNITED STATES PATENTS

| Number | Name | Date |
|---|---|---|
| 314,924 | Ervin | Mar. 31, 1885 |
| 872,820 | Johnson | Dec. 3, 1907 |
| 1,467,209 | Sumner | Sept. 4, 1923 |
| 1,910,600 | Fitch | May 23, 1933 |
| 2,321,377 | French | June 8, 1943 |
| 1,649,596 | Kane | Nov. 15, 1927 |
| 1,845,161 | Lewis | Feb. 16, 1932 |
| 2,126,404 | McLean | Aug. 9, 1938 |
| 1,518,808 | Moore | Dec. 9, 1924 |
| 1,993,475 | Butterfield | Mar. 5, 1935 |
| 1,729,173 | Marfaing | Sept. 24, 1929 |
| 2,105,473 | Dean | Jan. 18, 1938 |
| 2,291,626 | Huber | Aug. 4, 1942 |

FOREIGN PATENTS

| Number | Country | Date |
|---|---|---|
| 661,369 | French | Mar. 4, 1929 |
| 7,287 | British | Mar. 23, 1911 |